United States Patent
Keeney et al.

(10) Patent No.: US 6,647,149 B2
(45) Date of Patent: Nov. 11, 2003

(54) METHODS AND APPARATUS FOR SECURELY TRANSMITTING AND PROCESSING DIGITAL IMAGE DATA

(75) Inventors: Richard A. Keeney, Eagan, MN (US); Thor A. Olson, Minnetonka, MN (US)

(73) Assignee: Electronics for Imaging, Inc., Foster City, CA (US)

( * ) Notice: Subject to any disclaimer, the term of this patent is extended or adjusted under 35 U.S.C. 154(b) by 470 days.

(21) Appl. No.: 09/753,816

(22) Filed: Jan. 3, 2001

(65) Prior Publication Data

US 2002/0085734 A1 Jul. 4, 2002

(51) Int. Cl.[7] .................................................. G06K 9/46
(52) U.S. Cl. ........................ 382/240; 382/233; 382/251; 382/245; 380/210; 380/216; 380/217; 375/240.11
(58) Field of Search ................................ 382/232, 233, 382/236, 238, 239, 240, 245, 246, 248, 250, 251, 253; 348/398.1, 397.1, 416.1, 407.1; 713/160, 161, 176; 375/240.11, 240.25; 380/210, 233, 239, 220, 216, 217, 243; 360/48

(56) References Cited

U.S. PATENT DOCUMENTS

| | | |
|---|---|---|
| 5,001,561 A | 3/1991 | Haskell |
| 5,101,432 A | 3/1992 | Webb |
| 5,128,754 A | 7/1992 | Dhein |
| 5,504,816 A | 4/1996 | Hamilton |
| 5,546,477 A | 8/1996 | Knowles |
| 5,579,391 A | 11/1996 | Ihara |
| 5,633,684 A | 5/1997 | Teranishi |
| 5,699,484 A | 12/1997 | Davis |
| 5,721,778 A | 2/1998 | Kubota |
| 5,729,633 A | 3/1998 | Watanabe |
| 5,732,156 A | 3/1998 | Watanabe |
| 5,748,783 A | 5/1998 | Rhoads |
| 5,768,372 A | 6/1998 | Sung |
| 5,798,795 A | 8/1998 | Glenn |
| 5,809,139 A | 9/1998 | Girod |
| 5,872,784 A | 2/1999 | Rostoker |
| 5,915,017 A | 6/1999 | Sung |
| 5,943,421 A | 8/1999 | Grabon |
| 6,016,473 A | 1/2000 | Dolby |
| 6,035,044 A | * 3/2000 | Itoi .............................. 380/210 |
| 6,081,784 A | * 6/2000 | Tsutsui ........................ 704/501 |

FOREIGN PATENT DOCUMENTS

EP          0 619 677          10/1994

OTHER PUBLICATIONS

*Patent Abstracts of Japan*, Abstract of Japanese Patent "Image Enciphering Device", Publication No. 11088857, Mar. 30, 1999, Japanese Application No. 09237929, Filed Sep. 3, 1997.

* cited by examiner

*Primary Examiner*—Bhavesh M. Mehta
*Assistant Examiner*—Ali Bayat
(74) *Attorney, Agent, or Firm*—Barry R. Lipsitz; Douglas M. McAllister

(57) ABSTRACT

Methods and apparatus are provided for securely transmitting and processing digital image data for display. The invention provides for decomposing, compressing, and scrambling digital image data and forwarding the decomposed, compressed and scrambled image data to a destination where the image data is decompressed, re-composed, and descrambled prior to display. In particular, digital image data is scrambled before or after being compressed and is subsequently descrambled after being decompressed and prior to display such that unauthorized use of the image content is prevented. The invention can be used in conjunction with most standard block-based image compression algorithms such as JPEG as well as some types of wavelet transform based systems.

35 Claims, 4 Drawing Sheets

COMPRESSION FOLLOWED BY ENCRYPTION OR SCRAMBLING

SCRAMBLING PRIOR TO STANDARD COMPRESSION (I.E. JPEG)

SCRAMBLING INTEGRATED WITH COMPRESSION

EXAMPLE 140: SCRAMBLING AFTER COMPRESSION USING PARTIAL DECODE

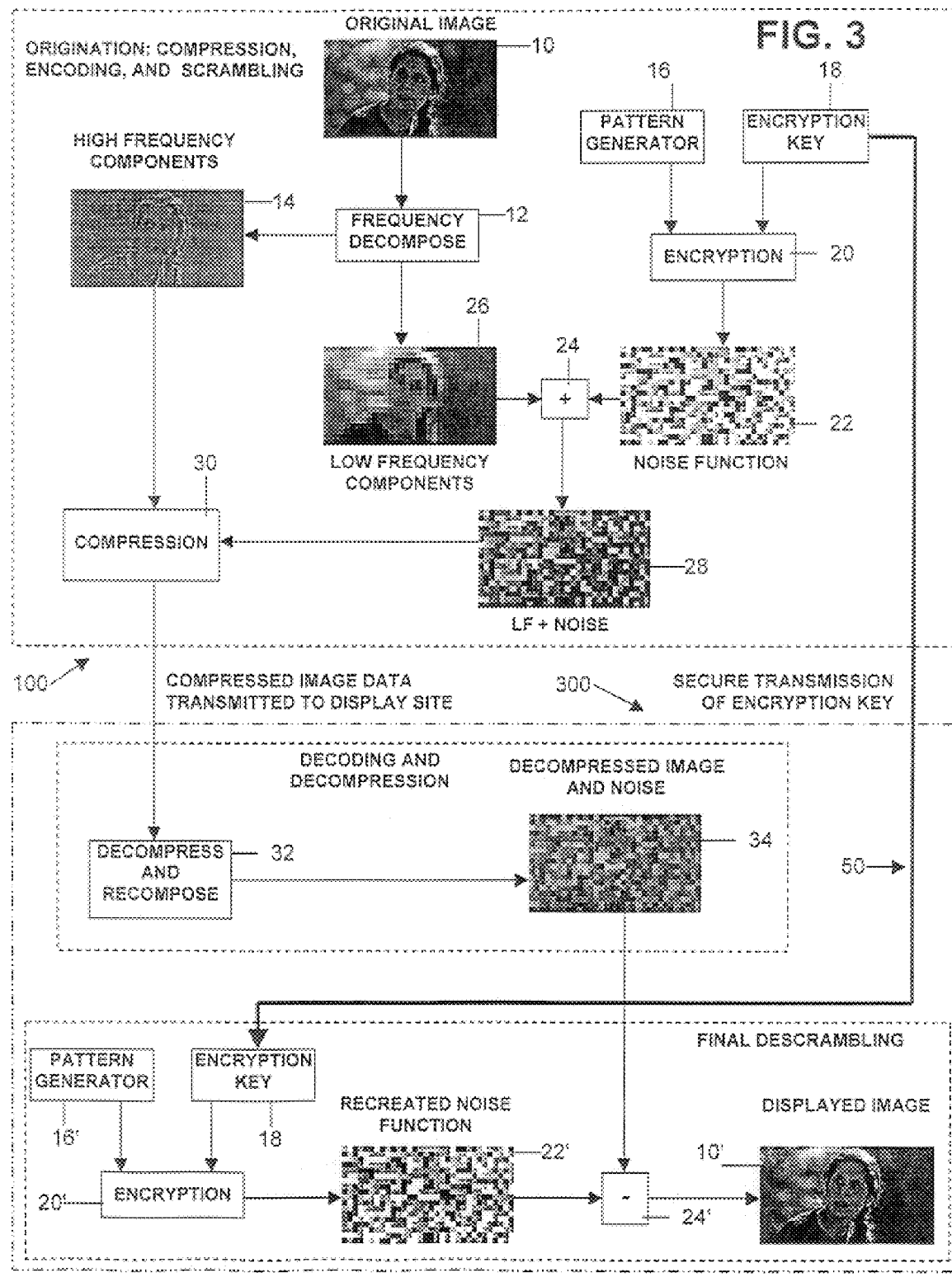

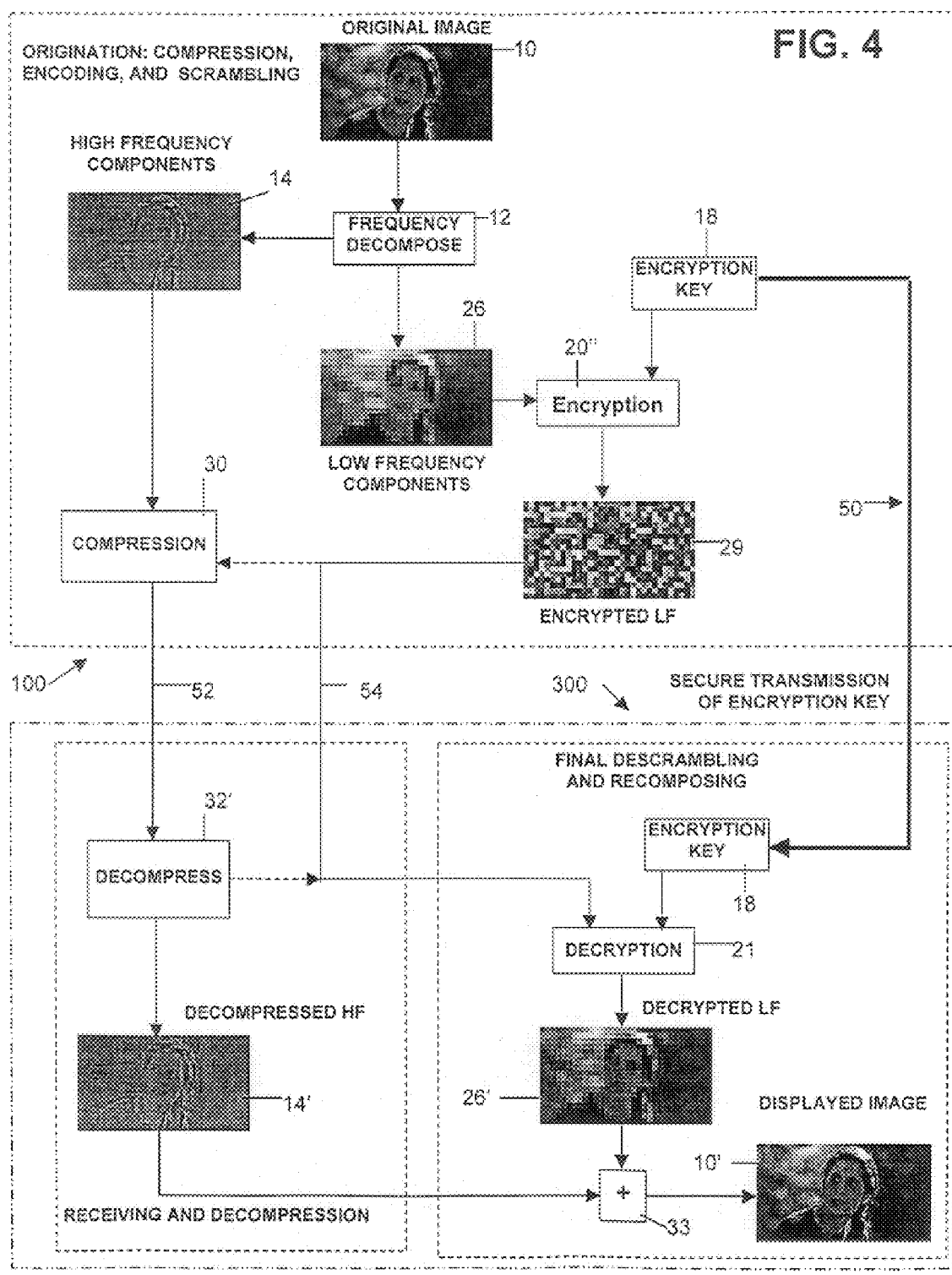

METHODS AND APPARATUS FOR SECURELY TRANSMITTING AND PROCESSING DIGITAL IMAGE DATA

BACKGROUND OF THE INVENTION

The present invention relates to methods and apparatus for securely transmitting and processing digital image data. The invention provides for decomposing, compressing, and scrambling digital image data and forwarding the decomposed, compressed and scrambled image data to a destination where the data is decompressed, re-composed, and descrambled prior to display. In particular, digital image data is scrambled before or after being compressed with, for example, a lossy image compression algorithm. The image data is subsequently descrambled after being decompressed and prior to display such that unauthorized use of the image content is made more difficult. The invention can be used, e.g., in conjunction with most standard block-based image compression algorithms such as JPEG as well as some types of wavelet transform based systems.

Many of the existing and most useful compression techniques for digital images do not work on random or encrypted data. These techniques take advantage of spatial coherence of adjacent pixels and thus they need a clear, unencrypted version of the picture to work with. Also, common decryption algorithms cannot recover a data stream where the exact bit patterns have been altered by these lossy image compression and decompression algorithms.

Thus, the order of processing the image data at the viewing destination is typically dictated to be decryption first, followed by decompression, and finally display. The existing methods do not provide the combination of efficient decryption with efficient decoding of compression techniques applied to the digital image data. The fact that there is a decrypted, but still compressed copy of the digital image data at some point in the playback system makes a tempting target for pirates. For example, it is much easier to tap into a data stream of 10 to 50 Mbytes per second of compressed motion picture image data than it would be to tap and record the uncompressed stream of up to 800 Mbytes per second.

It would be very desirable to have a system where the image data is instead decrypted after being decompressed and where decryption is the last step prior to display of the image. Even more desirable is to have the decryption process integrated with the actual display device. The present invention provides the above and other advantages. Corresponding methods and apparatus are provided.

SUMMARY OF THE INVENTION

The present invention relates to methods and apparatus for securely transmitting and processing digital image data for display. The invention provides for decomposing, compressing, and scrambling digital image data and forwarding the decomposed, compressed and scrambled image data to a destination where it is decompressed, re-composed, and descrambled prior to display. In particular, digital image data is scrambled before or after being compressed with a lossy image compression algorithm and is subsequently descrambled only after being decompressed and just prior to display.

The invention is described for use with digital image data (e.g., motion picture data) which can be compressed using frequency decomposition techniques. However, those skilled in the art will appreciate that the invention is applicable to other types of data and compression techniques, such as audio data compressed using the MP3 technique. The invention can also be used in connection with any type of data that can be decomposed into frequency components. For example, the invention is also applicable to image-like types of data, such as radar maps, weather maps, seismic data, and the like.

Further, although the invention is described herein as providing for enhanced security of the transmitted data by descrambling the data just prior to display, those skilled in the art will appreciate that the invention may be utilized to secure the transmission of data to any type of destination, whether for storage, display, re-transmission, or the like.

In a particular embodiment of the invention, digital image data is decomposed into low and high spatial frequency components. The low frequency components are scrambled and the high frequency components are compressed. The scrambling step may take place at any point in the sequence; prior to, between, or after the steps of decomposition and compression. The steps of decomposing the image data, scrambling the low frequency components, and compressing the high frequency components are performed at an origination site by an encoding device. The compressed high frequency components and the scrambled low frequency components are transmitted from the origination site to a viewing destination. At the viewing destination, the compressed high frequency components are decompressed by reversing the compressing step. Decompression is performed by a decompression device. The decompressed high frequency components and the scrambled low frequency components are re-composed into an image at the viewing destination and the low frequency components are descrambled at a descrambling device. After descrambling, the image is displayed by a display device.

The low frequency components may be descrambled prior to display of the image at a descrambling device which is associated with the display device.

Alternatively, the descrambing device may be integral to the display device. In addition, the decompression device may also be integrated with the display device, such that decompression and descrambling take place prior to display.

The high frequency components may be compressed using quantization, entropy encoding, encoding of repeating values or patterns of values, or any other suitable compression technique. Alternatively, the high frequency components may be compressed utilizing a lossy compression algorithm.

The image may be decomposed into high and low spatial frequency components using a wavelet transform on the image, a discrete cosine transform (DCT), or other suitable decomposition techniques.

The low frequency components may be scrambled by the addition of a spatial noise function. Descrambling of the low frequency components is accomplished by subtracting a spatial noise function from the low frequency components. The spatial noise function may be (1) a pre-selected pattern of values known to both the scrambling and descrambling steps; (2) the output or a function of the output of a pseudo-random number generator based on a key known to both the scrambling and descrambling steps; (3) the output or a function of the output of a cryptographic block cipher algorithm based on a key known by both the scrambling and descrambling steps; (4) the output or a function of the output of a cryptographic key-pair encryption/decryption algorithm where one key is known to the scrambling step and the matching key is known to the descrambling step; or (5) any other suitable spacial noise function.

In a further embodiment, the spatial noise function is generated at the origination site and then securely transmitted to the viewing destination.

In another embodiment, scrambling of the low frequency components takes place prior to the step of decomposing the image into high and low frequency components.

In an alternate embodiment, scrambling of the low frequency components comprises encrypting the low frequency components. The low frequency components are descrambled by decrypting the encrypted low frequency components. The compressed high frequency components may be transmitted from the origination site to the viewing destination via a first communication channel and the encrypted low frequency components may be transmitted from the origination site to the viewing destination via a second communication channel.

In a further embodiment, the low frequency components may be compressed prior to being transmitted to the viewing destination. The low frequency components may be compressed in the same manner as the high frequency components. The compressed low frequency components may then be decompressed at the viewing destination by reversing the compressing step.

The low frequency components may also be compressed prior to or after being scrambled.

BRIEF DESCRIPTION OF THE DRAWINGS

FIG. 3 is a flowchart illustrating an implementation of the invention; and

FIG. 4 is a flowchart illustrating an alternate implementation of the invention.

DETAILED DESCRIPTION OF THE INVENTION

The present invention relates to methods and apparatus for securely transmitting and processing digital image data for display. Such secure transmitting and processing of the digital image data are accomplished by decomposing, compressing, and scrambling digital image data and forwarding the decomposed, compressed and scrambled image data to a viewing destination where it is decompressed, re-composed, and descrambled prior to display. In particular, digital image data is scrambled before or after being compressed with, for example, a lossy image compression algorithm. The image data is subsequently descrambled after being decompressed and prior to display. The invention can be used in conjunction with most standard block-based image compression algorithms such as JPEG as well as some types of wavelet transform based systems.

The present invention introduces spatial noise into the image prior to compression, but in a manner that does not significantly interfere with the compression algorithm. In addition, the spatial noise is well preserved through the compression/decompression cycle, so it can be removed from the image without leaving significant artifacts. In some cases, the recovery of the image can be accomplished without any errors introduced from the addition and removal of the spatial noise.

The most useful and successful image compression algorithms generally decompose the image into various spatial frequencies. The lower spatial frequencies are encoded with the most precision to preserve smooth shading of large areas of the image as well as accurate color rendition. Precision in the higher spatial frequencies is sacrificed to achieve the desired compression ratio.

This accurate preservation of the lower spatial frequencies is utilized by the present invention. The spatial noise that is introduced is limited to these lower frequencies. Although limiting the frequency domain of the noise that is introduced may allow some portions of the image content to remain visible, the majority of the image content is obscured by the noise. The image is, therefore, generally rendered commercially useless. Thus, the present invention is useful for thwarting piracy and unauthorized viewing of commercially distributed digital image content.

Figure 1:
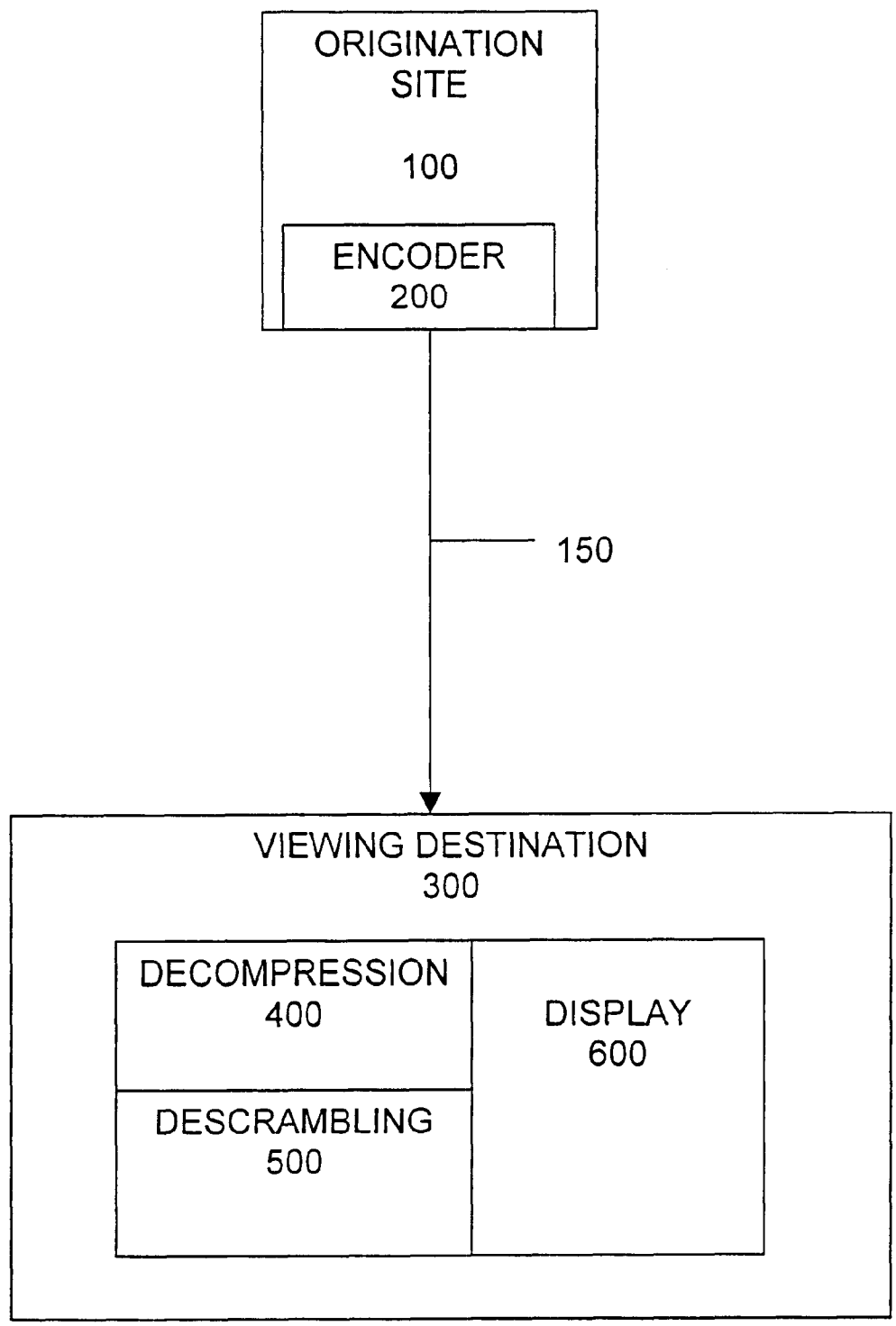
FIG. 1 is a block diagram illustrating the components of the present invention.

In a particular illustrated embodiment of the invention as shown in FIG. 1, digital motion picture image data is decomposed into low and high spatial frequency components. The low frequency components are scrambled. The high frequency components are compressed. Optionally, the low frequency components may be compressed as well, either before or after being scrambled. The steps of decomposing the image data, scrambling the low frequency components, compressing the high frequency components, and optionally compressing the low frequency components may be performed at an origination site 100 by an encoding device 200, or any other suitable device or combination of devices, which may be implemented in either hardware, firmware, software or a combination thereof.

Figure 2A:
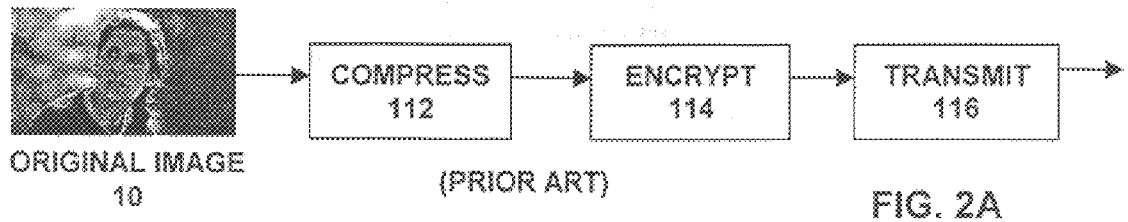
FIG. 2A is a block diagram of a prior art example of the order of image scrambling and compression.
Figure 2B:
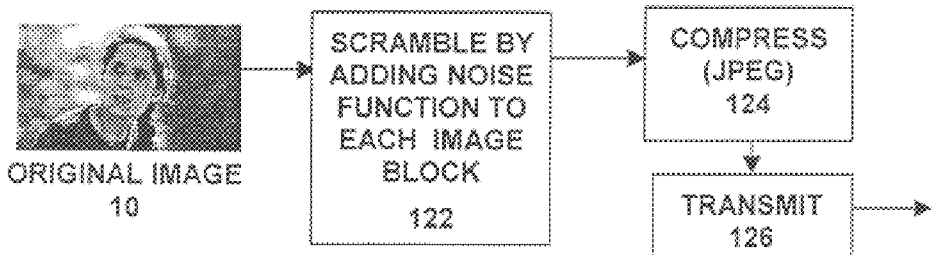
FIG. 2B is a block diagram of an example of the order of image scrambling and compression which can be used with the present invention.
Figure 2C:
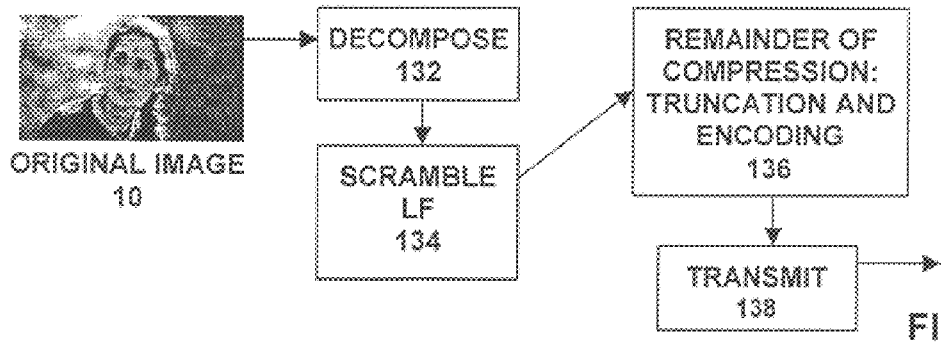
FIG. 2C is block diagram of an alternate example of the order of image scrambling and compression.
Figure 2D:
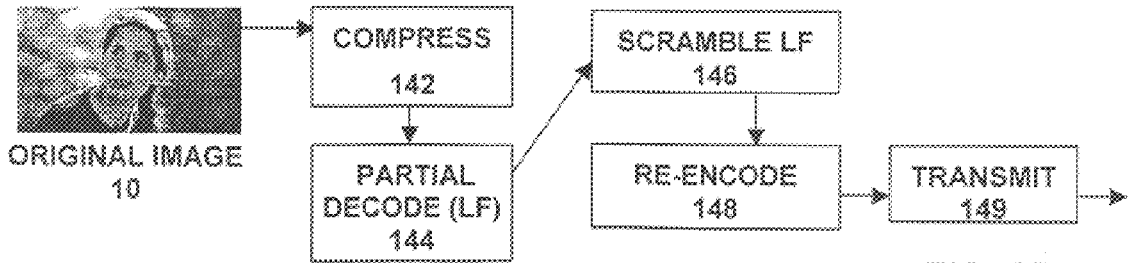
FIG. 2D is block diagram of a further alternate example of the order of image scrambling and compression.

The scrambling step may take place at any point in the sequence; prior to, between, or after the steps of decomposition and compression. For comparison purposes, FIG. 2A illustrates the typical prior art order, wherein an original image 10 is first compressed 112 and then encrypted (scrambled) 114, prior to being transmitted 116. FIG. 2B illustrates one order which may be implemented in the present invention. Original image 10 is first scrambled 122 by adding a noise function to each 8×8 pixel image block (e.g., the same 8×8 pixel blocks used in JPEG). The image blocks are then compressed 124 (e.g., using the JPEG compression algorithm) before being transmitted 126. Alternately, as shown in FIG. 2C, the original image 10 may be first decomposed into high and low frequency components 132 (e.g., using the discrete cosine transform (DCT)). The low frequency components may then be scrambled 134 and the high frequency components may be compressed 136 before the low and high frequency components are transmitted 138. The low frequency components may optionally be compressed along with the high frequency components. FIG. 2D shows a further alternative, wherein the original image 10 is first compressed 142 (e.g., using JPEG) and then the compressed image is partially decoded 144 to obtain the low frequency components, which are then scrambled 146. The scrambled low frequency components are then re-encoded 148 and the image data is transmitted 149.

Origination site 100 (FIG. 1) may be, for example, a mastering facility, production facility, uplink site, transmitter, network node, distribution center, scrambling system, software component or subsystem, or the like. The compressed high frequency components and the scrambled low frequency components are transmitted from the origination site 100 to a viewing destination 300 over communication channel 150. Communication channel 150 may be any suitable communication channel, such as a telephone line, fiber optic cable, coaxial cable, satellite communication channel, cellular telephone channel, Internet communication channel, FM communication channel, or any other suitable communication channel. Communication channel 150 may also comprise removable or recording media such as tapes, magnetic disks, memory cartridges, memory cards, optical disks, and the like.

At viewing destination 300, the compressed high frequency components are decompressed by reversing the compressing step. Decompression is performed by decompression device 400. The decompressed high frequency components and the scrambled low frequency components are re-composed into an image at the viewing destination and the low frequency components are descrambled at descrambling device 500. After descrambling, the image is displayed on or by a display device 600, such as a video projector, rear-view projector, micro-mirror display, or other suitable type of display.

Descrambling device 500 may descramble the low frequency components prior to display of the image, which descrambling device 500 is associated with display device 600.

Alternatively, descraming device 500 may be integral to display device 600. As a result, the image may be descrambled immediately prior to display, preferably on a real-time basis, and the unscrambled image data is never transmitted in unscrambled format on any communication path. In addition, decompression device 400 may also be integrated with the display device 600, such that decompression and descrambling take place on a real-time basis immediately prior to display.

The high frequency components and low frequency components may be compressed using any suitable data compression technique, such as quantization, entropy encoding, encoding of repeating values or patterns of values, or any other suitable compression technique. The compression used may be provided by a lossless or a lossy compression algorithm, although a lossy algorithm is preferred for ease in implementation. The high and low frequency components may be compressed using the same or different compression techniques.

The image may be decomposed into high and low spatial frequency components using a wavelet transform on the image, a discrete cosine transform (DCT), or other suitable decomposition technique.

The low frequency components may be scrambled by the addition of a spatial noise function thereto. Descrambling of the low frequency components is accomplished by subtracting the spatial noise function from the low frequency components. The spatial noise function may be, for example (1) a pre-selected pattern of values known to both the scrambling and descrambling steps; (2) the output or a function of the output of a pseudo-random number generator based on a key known to both the scrambling and descrambling steps; (3) the output or a function of the output of a cryptographic block cipher algorithm based on a key known by both the scrambling and descrambling steps; (4) the output or a function of the output of a cryptographic key-pair encryption/decryption algorithm where one key is known to the encoder 200 and the matching key is known to the descrambling device 500; or (5) any other suitable spatial noise function. The effectiveness of the protection provided by scrambling the low frequency components depends on how difficult it is to remove the spatial noise function from the image. Obviously, the descrambling function can have complete knowledge of the noise function, and as long as it is added to the image in a reversible manner, the descrambling function can remove the noise.

An unauthorized viewer, however, is faced with the task of removing the noise without complete knowledge of how it was generated. If the noise function is generated using the output of a strong cryptographic algorithm, the task of recovering the sequence of values used to generate the noise can be mathematically infeasible. Many types of strong cryptographic algorithms are well known to those skilled in the art. Almost all of them can be adapted to the task of generating an unpredictable (to those without the encryption key, but predictable to those with it) sequence of values (for example as described in American National Standard Institute (ANSI) X9.17, Appendix C).

Alternatively, the noise function used can be random, being derived from a chaotic physical system. Of course, the actual sequence of values used will need to be recorded in their entirety and transmitted along with the image in a secure manner.

The spatial noise function may be generated at origination site 100 and then securely transmitted to viewing destination 300.

In a further embodiment, low frequency components are compressed prior to being transmitted to the viewing destination 300. Compressed low frequency components are then decompressed at viewing destination by reversing the compressing step. In such an embodiment, the decompression function cannot be totally unaware of the spatial noise function. If, for example, the spatial noise is added in a modulo-$2^N$ manner where N is the number of bits representing each display value, decompression device 400 will preserve this relationship. Most decompression systems have some clipping functionality that has been added to prevent under-flow or over-flow types of problems when round-off or truncation of the coefficients adds a few counts of error to the recreated pixel value. This clipping functionality needs to be delayed until after the spatial noise function has been removed.

The low frequency components may be compressed prior to or after being scrambled at the origination site 100.

To be useful, the noise function needs to be compatible with the compression algorithm used. First, the noise itself needs to be well preserved by the compression algorithm, or degrade in a predictable and reversible way so that it can be accurately removed later. Second, the noise function should not significantly impact the performance of the compression algorithm in other ways such as introducing artifacts or by consuming precious output bits.

One suitable compression algorithm is commonly known as JPEG. In this algorithm, the image is first divided into 8×8 pixel blocks and these blocks are then decomposed into frequency components (in two dimensions) using the discrete cosine transform (DCT). The lowest frequency component is simply the average value of all the pixels in the block and is commonly referred to as the DC component for the block. It is this DC component that offers a suitable place to introduce a spatial noise function into the image. At low and moderate compression ratios, the DC component for the blocks is preserved with high precision.

The noise function can be introduced into the 8×8 block of pixels prior to compression by simply adding the same offset to all 64 pixels in the block. This addition can be modulo the bit depth of the pixel representation and still be reversible later. The DCT will fold this offset into the DC component encoded in the compressed image data stream.

Alternatively, the noise function can be added to the DC component for the blocks after the DCT, but prior to the other types of encoding employed by JPEG.

Another alternative would allow the noise to be added to an already encoded image by partially decoding it to recover the DC components, adding the noise to them, and then re-encoding the image.

Another compression algorithm that can be used with the present invention is based on the Haar wavelet transform. Haar teaches a method to recursively decompose a digital image into four sub-images. Three of the sub-images contain the higher frequency components of the original image, and the fourth sub-image contains a sub-sampled or low frequency representation of the original image. Recursively implementing this algorithm a few cycles results in a sub-sampled low frequency version of the image and several higher frequency band samplings of the image. The low frequency "base band" copy of the image is suitable for the introduction of the spatial noise function as described in the present invention.

In another embodiment, scrambling of the low frequency components at origination site 100 takes place prior to the step of decomposing the image into high and low frequency components.

The invention can be used with various display devices 600. In many types of display technologies, the display is built directly on an Application Specific Integrated Circuit (ASIC) implemented in complimentary metal oxide semi-conductor (CMOS), bipolar junction transistor (BJT), or any other suitable integrated circuit technologies. Digital logic in the ASIC may be used to control electrodes on the surface of the ASIC that affect the modulation of the light via an electro-optical or electro-mechanical-optical process. Although the present invention is not limited to these examples, three suitable display devices include a Liquid Crsytal on Silicon (LCoS) display, a Digital Micro-mirror Display (DMD), or a Grating Light Valve display (GLV). The integrated circuits used to construction these displays could additionally incorporate the circuitry to implement the descrambling of the image data as described herein.

The process of removing the spatial noise consists of two functions: first, recreating or obtaining the spatial noise function to be removed, and second, removing the effects of that noise from the pixels.

The spatial noise function may be specified by a fairly short encryption key built into the display device. For example, the encryption key may comprise 128 to 168 bits, although any other suitable bit length may be used. This key is used to encrypt a fixed pattern of values that matches a fixed pattern of values used during compression and scrambling of the image. The preferred encryption methods may include the International Data Encryption Algorithm (IDEA), or triple-DES (Data Encryption Standard). The pattern itself could be a pseudo-random sequence. To avoid weakening of the encryption algorithm through known-plain-text attacks, this pattern should remain secret as well.

For the 8×8 pixel block case of JPEG, a new value is required for every 64 pixels displayed. This $\frac{1}{64}^{th}$ of the pixel display bandwidth should not be an overly burdensome throughput at which to implement the encryption algorithm in the display ASIC. Other compression algorithms would be compatible with encryption throughputs in this range as well. Once the spatial noise pattern is recreated, the value corresponding to a block of pixels is simply subtracted from the 64 pixels in the block prior to being displayed.

As an example of an implementation of the present invention, FIG. 3 shows a flowchart of an illustrative embodiment. An original digital image 10 located at the origination site 100 is decomposed at 12 into high frequency components 14 and low frequency components 26. The high frequency components are compressed at 30 and transmitted to the viewing destination generally designated 300. A pattern generator 16 and an encryption key 18 are used to provide encryption as shown as 20. The encryption results in a noise function 22, which is added at 24 to the low frequency components 26, resulting in scrambled low frequency components 28. The scrambled low frequency components 28 may then be compressed at 30 and transmitted to the viewing destination 300 together with the compressed high frequency components 14.

At the viewing destination 300, the compressed high frequency components and the compressed and scrambled low frequency components are decompressed and re-composed at 32 into an image 34 comprising the original image plus the noise function. The encryption key 18 is separately and securely transmitted to the viewing destination 300 as indicated at line 50. Secure transmission of the key 18 may be accomplished using any suitable method, such as encrypting the key 18 using a key-encryption key known only to the receiving party. In addition, the key 18 may be transmitted over a secure channel such as a voice line, fax line or the like. The key 18 may be transported in a secure manner using a memory card or other computer media, a dongle, or simply printed on paper. A pattern generator 16' located at the viewing destination 300 and encryption key 18 are used to provide encryption as shown at 20' to recreate the noise function 22' at the viewing destination 300. This recreated noise function is then subtracted at 24' from the original image containing the noise function 34 to provide the final image 10' for display.

As a second example of an implementation of the present invention, FIG. 4 shows a flowchart of a second illustrative embodiment wherein scrambling of the low frequency components comprises encrypting the low frequency components. An original digital image 10 at origination site 100 is decomposed at 12 into high frequency components 14 and low frequency components 26. The high frequency components are compressed at 30 and transmitted to the viewing destination generally designated 300. An encryption key 18 is used to encrypt the low frequency components as shown at 20", resulting in encrypted low frequency components 29. The encrypted low frequency components 29 may then be compressed at 30 and transmitted to the viewing destination 300 together with the compressed high frequency components 14 via a communication channel 52.

Alternatively, the compressed high frequency components 30 may be transmitted via a first communication channel 52 to the viewing destination 300 and the encrypted low frequency components 29 may be transmitted via a second communication channel 54 to the viewing destination 300, either with or without being compressed.

In an embodiment where both the high and low frequency components are compressed and transmitted to the viewing destination 300 via communication channel 52, the compressed high frequency components and the compressed and encrypted low frequency components are decompressed at 32'. The encryption key 18 is separately and securely transmitted to the viewing destination 300 as indicated at line 50.

The encrypted low frequency components are then decrypted as shown at 21 to recreate the low frequency components 26' at viewing destination 300. The recreated low frequency components 26' and the decompressed high frequency components 14' are then re-composed at 33 to provide the final image 10' for display.

In an embodiment where the compressed high frequency components 30 are transmitted to the viewing destination 300 via communication channel 52, and the uncompressed encrypted low frequency components 29 are transmitted to the viewing destination 300 via communication channel 54, the high frequency components will be decompressed at 32'. The encryption key 18 is separately and securely transmitted to the viewing destination 300 as indicated at line 50. The encrypted low frequency components are decrypted as shown at 21 to recreate the low frequency components 26' at viewing destination 300. The recreated low frequency components 26' and the decompressed high frequency components 14' are then re-composed at 33 to provide the final image 10' for display.

It will now be appreciated that the present invention provides an improved method and apparatus for securely processing and transmitting scrambled digital image data for display, wherein the scrambled image data is descrambled prior to display to prevent unauthorized use or viewing of the image content.

Although the invention has been described in connection with preferred embodiments thereof, those skilled in the art will appreciate that numerous adaptations and modifications may be made thereto without departing from the spirit and scope of the invention, as set forth in the following claims.

What is claimed is:

1. A method for processing digital image data comprising:
    decomposing an image into low and high spatial frequency components;
    scrambling the low frequency components;
    compressing the high frequency components;
    transmitting the compressed high frequency components and the scrambled low frequency components from an origination site to a viewing destination;
    decompressing the compressed high frequency components at the viewing destination by reversing the compressing step;
    re-composing the decompressed high frequency components and the scrambled low frequency components into an image;
    descrambling the low frequency components; and
    displaying the image.

2. A method in accordance with claim 1, wherein the descrambling of the low frequency components takes place just prior to displaying the image at a descrambling device which is associated with a display device.

3. A method in accordance with claim 1, wherein the descrambling of the low frequency components takes place at a display device.

4. A method in accordance with claim 1, wherein the compressing of the high frequency components is accomplished using at least one of quantization, entropy encoding, and encoding of repeating values or patterns of values.

5. A method in accordance with claim 1, wherein the decomposing of the image into high and low spatial frequency components is accomplished using a wavelet transform on the image.

6. A method in accordance with claim 1, wherein:
    the scrambling of the low frequency components comprises the addition of a spatial noise function to the low frequency components; and
    the descrambling of the scrambled low frequency components comprises subtracting the spatial noise function from the low frequency components.

7. A method in accordance with claim 6, wherein the spatial noise function is a pre-selected pattern of values known to both the scrambling and descrambling steps.

8. A method in accordance with claim 6, wherein the spatial noise function is one of the output or a function of the output of a pseudo-random number generator based on a key known to both the scrambling and descrambling steps.

9. A method in accordance with claim 6, wherein the spatial noise function is one of the output or a function of the output of a cryptographic block cipher algorithm based on a key known by both the scrambling and descrambling steps.

10. A method in accordance with claim 6, wherein the spatial noise function is one of the output or a function of the output of a cryptographic key-pair encryption/decryption algorithm where one key is known to the scrambling step and the matching key is known to the descrambling step.

11. A method in accordance with claim 6, wherein the spatial noise function is generated at the origination site and then securely transmitted to the viewing destination.

12. A method in accordance with claim 1, wherein the scrambling of the low frequency components takes place prior to the decomposing of the image into high and low frequency components.

13. A method in accordance with claim 1, wherein the compressing of the high frequency components is performed using a lossy compression algorithm.

14. A method in accordance with claim 1, wherein:
    the scrambling of the low frequency components comprises encrypting the low frequency components; and
    the descrambling of the low frequency components comprises decrypting the encrypted low frequency components.

15. A method in accordance with claim 14, wherein the transmitting comprises:
    transmitting the compressed high frequency components from the origination site to the viewing destination via a first communication channel; and
    transmitting the encrypted low frequency components from the origination site to the viewing destination via a second communication channel.

16. A method in accordance with claim 1, further comprising:
    compressing the low frequency components prior to transmitting the low frequency components to the viewing destination; and
    decompressing the compressed low frequency components at the viewing destination by reversing the compressing step.

17. A method in accordance with claim 16, wherein the compressing of the low frequency components takes place prior to the scrambling of the low frequency components.

18. Apparatus for processing received digital image data at a viewing destination comprising:
    an image display device;
    a decompression device; and
    a descrambling device; wherein
        image data comprising scrambled low spatial frequency components and compressed and unscrambled high spatial frequency components is received at the viewing destination;
        the compressed high frequency components are decompressed at the decompression device;
        the decompressed high frequency components and the scrambled low frequency components are re-composed into an image and forwarded from the decompression device to the descrambling device;

the low frequency components are descrambled at the descrambling device; and the image is displayed by the display device.

19. Apparatus in accordance with claim 18, wherein the low frequency components are descrambled just prior to the display of the image at a the display device.

20. Apparatus in accordance with claim 18, wherein the decompression and descrambling devices are integral to the display device.

21. Apparatus in accordance with claim 18, wherein the high frequency components have been compressed using at least one of quantization, entropy encoding, and encoding of repeating values or patterns of values.

22. Apparatus in accordance with claim 18, wherein the image has been decomposed into high and low spatial frequency components using a wavelet transform on the image.

23. Apparatus in accordance with claim 18, wherein:

the low frequency components have been scrambled by the addition of a spatial noise function thereto; and the low frequency components are descrambled at the descrambling device by subtracting the spatial noise function from the image.

24. Apparatus in accordance with claim 23, wherein the spatial noise function is a pre-selected pattern of values known to both the scrambling device and the descrambling device.

25. Apparatus in accordance with claim 23, wherein the spatial noise function is one of the output or a function of the output of a pseudo-random number generator based on a key known to both the scrambling device and the descrambling device.

26. Apparatus in accordance with claim 23, wherein the spatial noise function is one of the output or a function of the output of a cryptographic block cipher algorithm based on a key known by both the scrambling device and the descrambling device.

27. Apparatus in accordance with claim 23, wherein the spatial noise function is one of the output or a function of the output of a cryptographic key-pair encryption/decryption algorithm where one key is known to the scrambling device and the matching key is known to the descrambling device.

28. Apparatus in accordance with claim 23, wherein the spatial noise function is generated at an origination site and then separately and securely transmitted to the descrambling device.

29. Apparatus in accordance with claim 18, wherein at an encoder device the low frequency components of the image data are scrambled and the image data is subsequently decomposed into high and low frequency components and compressed before being received at the decompression device.

30. Apparatus in accordance with claim 18, wherein the high frequency components are compressed utilizing a lossy compression algorithm.

31. Apparatus in accordance with claim 18, wherein prior to the image data being received at the viewing destination:

the image data is decomposed into high and low spatial frequency components;

the low frequency components are scrambled by the addition of a spatial noise function;

the high frequency components are compressed;

the compressed high frequency components are transmitted to the viewing destination; and the scrambled low frequency components are transmitted to the viewing destination.

32. Apparatus in accordance with claim 18, wherein the scrambled low frequency components comprise encrypted low frequency components; and the descrambling device comprises a decrypting device which decrypts the encrypted low frequency components.

33. Apparatus in accordance with claim 32, wherein:

the compressed high frequency components are received by the decompression device via a first communication channel; and the encrypted low frequency components are received by the decompression device via a second communication channel.

34. Apparatus in accordance with claim 18, wherein:

the low frequency components are compressed and transmitted to the decompression device at the viewing destination for decompression prior to being forwarded to the descrambling device.

35. Apparatus in accordance with claim 34, wherein at an encoder device the low frequency components are compressed prior to being scrambled.

* * * * *